J. BENTON.
MULTIPLE CUP MOLD.
APPLICATION FILED FEB. 25, 1919.

1,349,546.

Patented Aug. 10, 1920.
2 SHEETS—SHEET 1.

Witnesses
Wm R. Smith

Inventor
James Benton
By Victor J. Evans
Attorney

J. BENTON.
MULTIPLE CUP MOLD.
APPLICATION FILED FEB. 25, 1919.
1,349,546.
Patented Aug. 10, 1920.
2 SHEETS—SHEET 2.
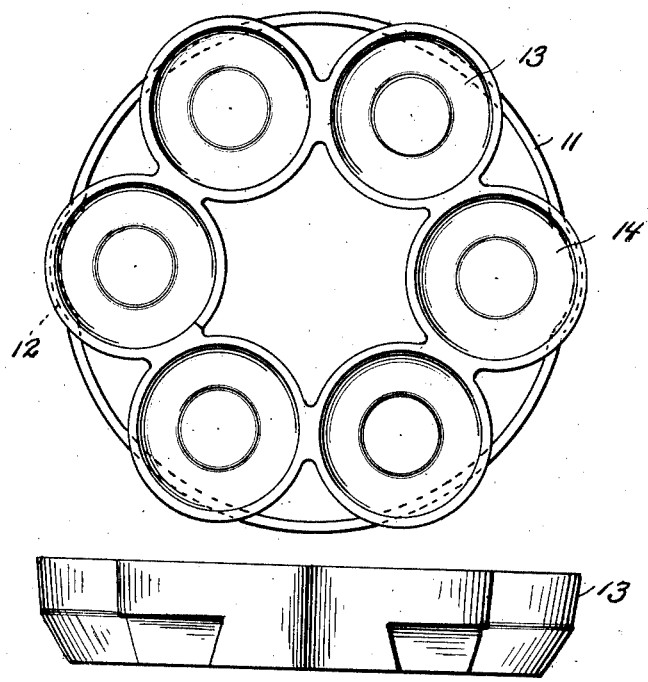
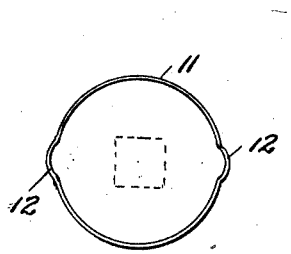
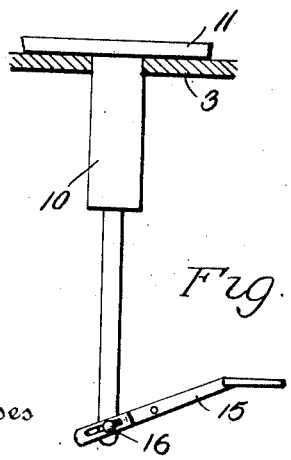
Witnesses
Wm R. Smith
Inventor
James Benton.
By Victor J. Evans
Attorney

UNITED STATES PATENT OFFICE.

JAMES BENTON, OF EAST PALESTINE, OHIO.

MULTIPLE-CUP MOLD.

1,349,546.   Specification of Letters Patent.   Patented Aug. 10, 1920.

Application filed February 25, 1919. Serial No. 279,087.

*To all whom it may concern:*

Be it known that I, JAMES BENTON, a citizen of the United States, residing at East Palestine, in the county of Columbiana and State of Ohio, have invented new and useful Improvements in Multiple-Cup Molds, of which the following is a specification.

This invention relates to a molding machine and has for its primary object to provide a machine of simple substantial construction by means of which a multiplicity of articles may be formed at one operation of the machine thus preventing a separate operation for each article formed.

An object of the invention is to provide a simple construction for moving a mold into and out of an operative position at a single operation.

Another object of the invention is to provide a plurality of forming elements so arranged and associated that at a single operation of the machine each element will perform a separate function for forming an article.

Besides the above my invention is distinguished in a mold, having a multiplicity of forming pockets, supported and movable by a frame in a manner that the pockets are continuously held in alinement with an equal number of forming tools while at the same time capable of being moved into coöperative relation with the tools, the parts being so arranged that gravity is relied on to move the mold to inoperative position.

With these and other objects in view the invention will be better understood from the following detailed description taken in connection with the accompanying drawings wherein:—

Fig. 3 is a top plan view of the mold.

Fig. 4 is a side elevation thereof.

Fig. 5 is a detailed view of the mold supporting frame.

Fig. 6 is a top plan view of the frame.

Figure 1:
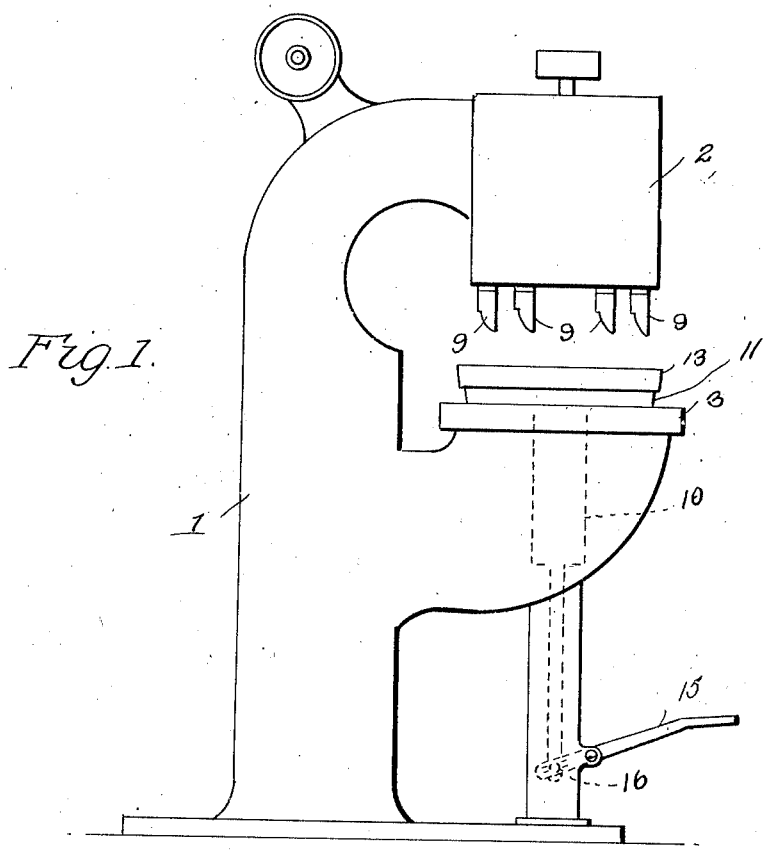
Figure 1 is a side elevation of the machine.
Figure 2:
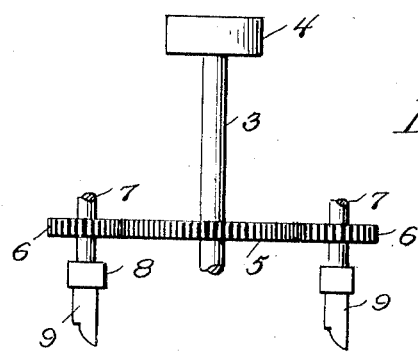
Fig. 2 is a detailed view of the drive between the forming tools.

Again referring to the drawings which illustrate one form that my invention may assume, the numeral 1 designates the body of the machine shaped to provide a head 2 directly over a table 3. The head 2 has arranged therein as clearly shown in Fig. 2, a shaft $3^a$ provided at one end with a pulley 4 driven in any suitable manner while at the lower end of the shaft $3^a$ there is secured thereto a gear 5 constantly in mesh with gears 6 upon stub shafts 7. Each stub shaft is provided with a socket 8 supporting a forming tool 9. By the mechanism just described it will be seen that the tools are simultaneously rotated and owing to the construction of my invention these tools may be continuously rotated.

Passing through the table 3 as shown clearly in Fig. 5, is the square extension 10 of a frame 11. This frame 11 has an upstanding circular flange provided with diametrically arranged portions 12 offset so as to grip two of the pockets 14 and hold the mold against circumferential movement thus preventing the axis of each of the pockets or forming recesses 14 in the mold from moving out of alinement with a tool 9 thereby insuring the proper coöperation between the wall of a recess 14 and the forming edge of a tool, the other pockets being cut away to accommodate flange 11.

A very important feature of my invention is the mold 13 which is shown as constructed of a single piece of material having a multiplicity of pockets 14 thereby enabling me to make a plurality of articles at one operation of the machine. When the pockets have been filled with material, such as clay when forming cups, the mold is bodily moved vertically by displacing the foot lever 15 that has a pin and slot connection 16 with the frame. When the foot lever 15 has been forced downward to its limit of travel the pockets 14 will be brought into proper relation to the tools 9 so that during the rotation of the latter the material in the pockets will be properly shaped and properly forced into contact with the walls of the pockets for giving the proper contour to the articles. A very important feature of my invention is that when the machine is used to make pottery, six cups, saucers or other articles, may be made at one operation of the machine thus preventing the necessity of an operation for each article that is formed.

Although in the drawing I have shown a mold as the movable element for the sake of simplicity, it is to be understood that the mold may be stationary and the forming tools moved toward the mold. It is of course to be understood that the mold as well as the machine associated with the mold may be constructed in various other manners than shown and the tools may be driven in a plurality of other ways and the mold may be given its movement in various other manners than shown, therefore I do not desire to be limited in any manner except as set forth in the claims hereunto appended.

Having described my invention, what I claim is:

1. A mold consisting of a plurality of connected circularly arranged elements each forming a molding pocket.

2. In a molding machine, a plurality of circularly arranged molding pockets, a plurality of circularly arranged forming tools corresponding in number to the pockets and in alinement with the respective pockets, and means for simultaneously operating all of said tools.

3. In a molding machine, a mold provided with a plurality of circularly arranged molding pockets, a drive shaft, a plurality of stub shafts disposed concentric with the drive shaft and in alinement with the respective pockets, forming tools carried by said stub shafts, the pockets being movable simultaneously into and out of operative relation to said tools, and driving connections between the drive shaft and the stub shafts for simultaneously rotating the latter.

4. In a molding machine, a plurality of circularly arranged molding pockets, a drive shaft, a gear secured thereon, a plurality of stub shafts corresponding in number to the pockets, said stub shafts being disposed concentric with the drive shaft and each provided with a gear meshing with the gear of said drive shaft, forming tools carried by the stub shafts and in alinement with the respective pockets, and means for moving all of said pockets simultaneously into and out of operative relation to the forming tools.

In testimony whereof I affix my signature.

JAMES BENTON.